United States Patent [19]

Maus et al.

[11] Patent Number: 4,824,011
[45] Date of Patent: Apr. 25, 1989

[54] CATALYST CARRIER BODY AND METHOD AND APPARATUS FOR BRAZING THE SAME

[75] Inventors: Wolfgang Maus, Bergisch Gladbach; Rolf Kottmann, Lindlar; Theodor Cyron, Bergisch Gladbach; Ludwig Wieres, Overath, all of Fed. Rep. of Germany

[73] Assignee: Interatom GmbH, Bergisch-Gladbach, Fed. Rep. of Germany

[21] Appl. No.: 923,308

[22] Filed: Oct. 27, 1986

[30] Foreign Application Priority Data

Oct. 25, 1985 [DE] Fed. Rep. of Germany ....... 3538080

[51] Int. Cl.⁴ .............................................. B23K 31/02
[52] U.S. Cl. .............................. 228/173.7; 219/121.63; 219/121.85; 29/157 R; 228/181
[58] Field of Search ................... 228/173.7, 248, 182, 228/183, 181; 29/157 R, DIG. 24; 219/121.1 C, 121 D, 121 LM

[56] References Cited

U.S. PATENT DOCUMENTS

| 4,185,185 | 1/1980 | Adlam ........................ 219/121 LM |
| 4,186,172 | 1/1980 | Sholz .................................. 29/151 R |
| 4,521,947 | 6/1985 | Nonnenman et al. ........... 228/173.7 |
| 4,524,259 | 6/1985 | Wolf et al. .................... 219/121 CE |
| 4,574,180 | 3/1986 | Kasner et al. ................ 219/121 LC |
| 4,626,653 | 12/1986 | Sciaky et al. ................ 219/121 LC |
| 4,705,933 | 11/1987 | Van Bennekam et al. ... 219/121 LC |

FOREIGN PATENT DOCUMENTS

| 0049489 | 1/1981 | European Pat. Off. . |
| 0136514 | 8/1984 | European Pat. Off. . |
| 2736313 | 2/1979 | Fed. Rep. of Germany ...... 228/181 |
| 2727967 | 10/1983 | Fed. Rep. of Germany . |
| 2566306 | 12/1985 | France ......................... 219/121 LM |
| 0091994 | 7/1981 | Japan ............................ 219/121 LC |

OTHER PUBLICATIONS

Welding Research, vol. 59, No. 10, Oct. 1980, pp. 267–277.

Primary Examiner—Nicholas P. Godici
Assistant Examiner—Karen Skillman
Attorney, Agent, or Firm—Herbert L. Lerner; Laurence A. Greenberg

[57] ABSTRACT

A method for producing honeycomb-like brazed metallic catalyst carrier bodies, includes applying brazing material to thin structured metal sheets, subsequently heating areas to be brazed with laser beams producing brazed connections, and rolling or laminating the metal sheets in alternating layers. An apparatus for producing the bodies and the bodies themselves are also provided.

9 Claims, 2 Drawing Sheets

CATALYST CARRIER BODY AND METHOD AND APPARATUS FOR BRAZING THE SAME

The invention relates to a method for producing honeycomb-like brazed metallic catalyst carrier bodies, formed of thin, structured, metal sheets rolled or laminated in alternating layers, an apparatus for performing the method and a catalyst carrier body produced by the method.

The brazing of metallic catalyst carrier bodies is known, for example, from European Patent Application No. 00 49 489 and various brazing application techniques are also known in the prior art. However, such catalyst carrier bodies were heretofore always brazed in brazing ovens only, because the materials used were heated in a protective gas or in a vacuum in order to prevent oxidation.

German Patent DE-PS No. 27 27 967 describes a method of laser beam welding of catalyst carrier bodies. However, welded connections of this kind do not meet the stringent demands for tensile strength required for withstanding the alternating thermal stresses on a catalyst carrier body.

It is accordingly an object of the invention to provide a catalyst carrier body and a method and apparatus for brazing the same, which overcomes the hereinafore-mentioned disadvantages of the heretofore-known catalyst carrier bodies, methods an apparatus of this general type and which combines the advantages of brazing with those of laser welding.

With the foregoing and other objects in view there is provided, in accordance with the invention, a method for producing honeycomb-like brazed metallic catalyst carrier bodies, which comprises applying brazing material to thin structured metal sheets, subsequently heating areas to be brazed with laser beams producing brazed connections, and rolling or laminating the metal sheets in alternating layers. On one hand, this method is very fast and on the other hand, and it requires much less expenditure for equipment than high-temperature brazing in a vacuum oven.

In accordance with another mode of the invention, there is provided a method which comprises applying the brazing material to the metal sheets in a conventional manner prior to the rolling or laminating step, producing the brazed connections at a given number of points of contact between the metal sheets during or after the rolling or laminating step, and producing the brazed connections at one or a few of the given number of points of contact at a time. During the application of brazing material prior to the rolling, brazing material is trapped between the individual layers; in previous brazing methods performed in an oven, this has proved to be disadvantageous, because the simultaneous melting of all of the brazing material layers has led to undesirable changes in shape. However, in the method according to the invention, this disadvantage no longer arises. Thus all of the methods of applying brazing material according to the prior art can be used prior to or during the rolling or laminating step.

In accordance with a further mode of the invention, there is provided a method which comprises optionally selectively applying brazing material in a conventional manner to at least one outer surface of the metal sheets after the rolling or laminating step and prior to producing the brazed connections with the laser beams. Corresponding brazing application techniques are described, for example European Patent Application No. 01 36 514 and in co-pending U.S. application Ser. No. 897,753 filed Aug. 18, 1986.

There are many possible ways of directing or aiming the laser beam at the catalyst carrier body during brazing, so as to reach the intended target. The accuracy of positioning of the laser determines whether work has to be done with a very fine laser beam and a correspondingly short action time, or with a wider laser beam and a somewhat longer action time. In accordance with an added mode of the invention, there is provided a method which comprises defocussing the laser beams to cover an area somewhat greater than the height of honeycombs formed in the metal sheets. This is done so that a laser beam striking a side surface will always meet points of contact located between the individual sheet metal layers without being adjusted precisely.

In accordance with an additional mode of the invention, there is provided a method which comprises adjusting the laser beams at the areas to be brazed to a diameter which is only considerably smaller than the height of honeycombs in the metal sheets. With precise adjustment of the laser, it is possible to work with a very much smaller diameter of the laser beam and as a result, the operating time at the brazing location can be shortened.

In accordance with yet another mode of the invention, there is provided a method which comprises moving the laser beams during the rolling or laminating step in accordance with increasing structural size of the metal sheets so as to braze layers being added. This is required if the brazing process is to be performed during rolling or laminating of a catalyst carrier body.

In accordance with yet a further mode of the invention, there is provided a method which comprises moving the laser beams and the metal sheets relative to one another while producing the brazed connections for sweeping the laser beams at least partly over outer surfaces and/or end surfaces and/or lateral surfaces of the metal sheets. This is a particularly simple method, which does not require any special adjusting devices or other controls for the laser.

In accordance with yet an added mode of the invention, there is provided a method which comprises directing the laser beams at end surfaces of the metal sheets at an angle for adjusting the depth of the areas to be heated. As a result, not only can the depth of the areas encompassed by the laser beam be adjusted, but therefore the size of the area to be brazed can be adjusted as well. It should be noted at this point that the laser beams are partly reflected by the metal sheets and thus penetrate farther into the individual channels of the catalyst carrier body, if a corresponding angle of incidence is selected.

In accordance with still another mode of the invention, there is provided a method which comprises directing the laser beams at areas where the sheet metal layers first come into contact during the rolling step. In this case there are also many possibilities for the orientation of the laser beams. They may be approximately tangential to the roll, as will be described in greater detail in conjunction with the drawings, or they may be aimed at the end surfaces at predetermined angles.

In accordance with still a further mode of the invention, there is provided a method which comprises regulating the intensity of the laser beams in dependence on the rolling speed. This is done in order to attain optimal conditions during brazing, so that the metal sheets will not melt at an overly low rolling speed.

In accordance with still an added mode of the invention, there is provided a method which comprises pulsing the laser beams in synchronism with the arrival of points of contact between the sheets. During the pulsating operation of the laser, the pulses can be synchronized in such a way that they are triggered whenever a new point of contact is produced between the sheet metal layers.

In accordance with a concomitant mode of the invention, there is provided a method which comprises performing the applying, heating and rolling or laminating steps in a normal atmosphere without protective gas and not in a vacuum.

With the objects of the invention in view there is also provided an apparatus for producing brazed catalyst carrier bodies from structured thin metal sheets rolled in alternating layers, comprising means for rolling thin metal sheets together beginning at areas where the sheets first touch one another and forming a roll with increasing structural size, at least one high-energy laser directed at the areas where the metal sheets first touch one another during rolling, and a tracking apparatus for tracking the laser beams in accordance with the increasing structural size of the roll.

In accordance with another feature of the invention, there are provided means for applying brazing material to the metal sheets.

This apparatus has at least one high-energy laser, which is aimed at the areas where the sheet metal layers first come into contact during the rolling process. A tracking device is provided, which readjusts the laser in accordance with the increasing structural size of the catalyst carrier body. An apparatus of this kind is similar in principle to known apparatus in which lasers are used for welding; however, in this instance the catalyst carrier body struck by the laser must already have had brazing material applied to it by suitable methods.

With objects of the invention in view, there is also provided a catalyst carrier body formed of structured thin metal sheets rolled or laminated in alternating layers, comprising brazed connections between the metal sheets produced by heating with laser beams.

Other features which are considered as characteristic for the invention are set forth in the appended claims.

Although the invention is illustrated and described herein as embodied in a catalyst carrier body and a method and apparatus for brazing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
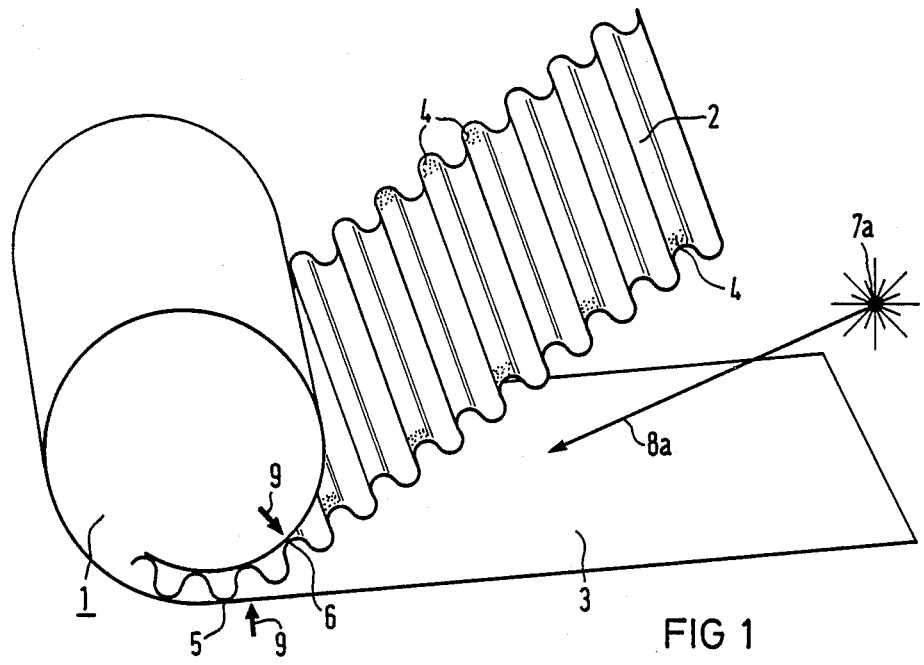
FIG. 1 is a diagrammatic perspective view illustrating the rolling process during the production of a catalyst carrier body and the possible kinds of laser beam action.

Referring the figures of the drawings in detail and first, particularly, to FIG. 1 thereof, there is seen a partially rolled-up catalyst carrier body 1, which is formed of one corrugated sheet-metal strip 2 and one flat sheet-metal strip 3. Prior to the rolling process, predetermined areas 4 on the waves of the corrugated sheet-metal strip 2 can be provided with brazing material, such as by using a contact adhesive, as is known in the prior art. Upon being rolled, the sheet-metal strips first come into contact at points of contact 5, 6 indicated by arrows 9, so that they can be brazed there by the action of laser light. Various directions of action by laser beams 8a, 8b are shown as examples. Lasers 7a, 7b themselves can be accommodated at a suitable location outside the rolling apparatus, because the laser beams can be deflected by suitable optical means. As shown, the laser beams can act either from the direction in which the sheet-metal strips 2, 3 arrive, or in the direction toward the end surfaces of the catalyst carrier body 1. Various angles and directions are possible, depending on the length of the areas that have brazing material applied and those that are to be brazed. In general, two or four laser beams are required, depending upon the disposition selected.

Figure 2:
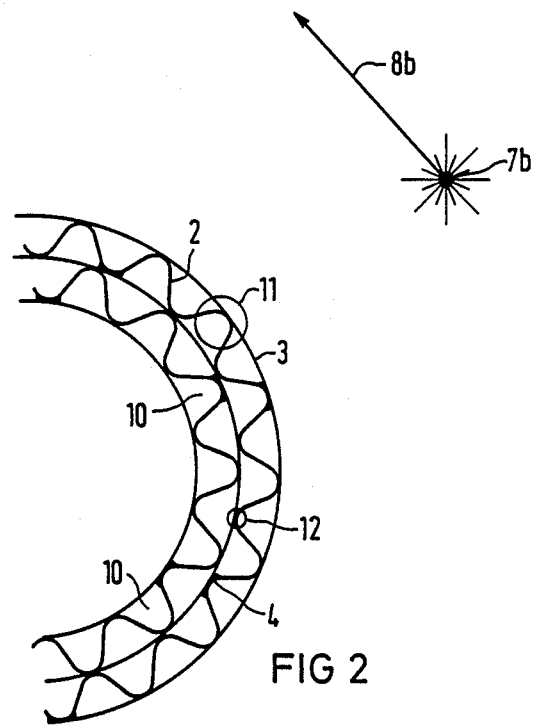
FIG. 2 is an enlarged, fragmentary, side-elevational view of a portion of the end surface of a catalyst carrier body, illustrating the surface acted upon by a laser beam.

FIG. 2 diagrammatically illustrates the end surface of catalyst carrier body made from corrugated sheets 2 and flat sheets 3, on a larger scale. A catalyst carrier body of this kind accordingly has a large number of channels 10. Various provisions can be made, in order for the predetermined areas 4 having the individual points of contact, to which brazing material has been applied, and which are to be brazed, to be struck by the laser beam. If no provision is made for precise adjustment of the laser, then the laser beam should be defocussed, as indicated by the circle 11, to such an extent that it is larger than the distance through which the individual points of contact are spaced apart. If such a laser beam 11 sweeps over the end surface of a catalyst carrier body, then in any position it will necessarily meet points of contact that are to be brazed. If it is possible to attain greater accuracy of the target, then the diameter of the laser beam can also be made very small, as indicated by the small circle 12, so that in such a case a brazing operation only takes place if the laser beam 12 exactly meets an area 4 that is to be brazed.

Figure 3:
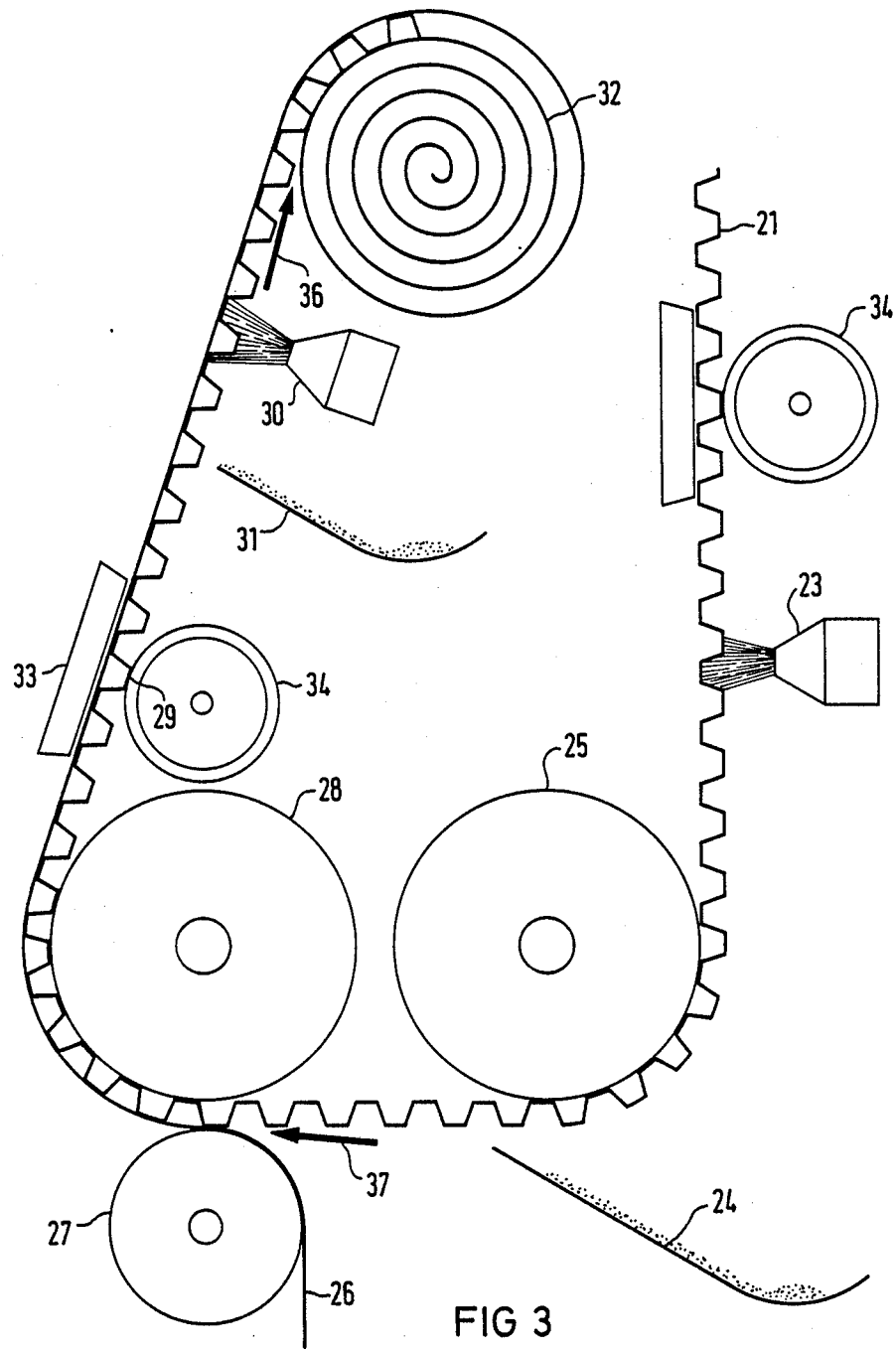
FIG. 3 is a fragmentary, side-elevational view showing the structure of a brazing material-applicator and roller apparatus, illustrating possible kinds of laser beam action.

In FIG. 3, a diagrammatic overview is provided of a rolling process, including the application of brazing material. A trapezoidally or otherwise corrugated metal sheet 21 first travels through a first adhesive applying station 34 and then through a spraying apparatus 23, after which the brazing powder that has been applied to excess drops into a collector 24 disposed beneath a deflector roller 25. Subsequently, another flat sheet-metal band 26 is guided over a deflector roller 27 and carried together with the corrugated sheet-metal band 21 over a deflector roller 28 and through a second adhesive applying station 29. The bands are then coated with brazing powder by another spraying apparatus 30, below which another collector 31 is disposed for receiving the excess brazing powder which was sprayed on. The corrugated sheet-metal band 21 and the flat sheet-metal band 26 are then rolled up together to make a catalyst carrier body. With this apparatus, brazed connections can be produced by the action of laser beams at points indicated by arrows 36, 37, where the two sheet-metal strips first come into contact with one another.

The foregoing is a description corresponding in substance to German Application No. P 35 38 080.2, dated Oct. 25, 1985, the International priority of which is being claimed for the instant application, and which is hereby made part of this application. Any material discrepancies between the foregoing specification and the aforementioned corresponding German application are to be resolved in favor of the latter.

We claim:

1. Method for producing honeycomb-like brazed metallic catalyst carrier bodies, which comprises applying brazing material to thin at least partially structured metal sheets having end surfaces, rolling or laminating the metal sheets in alternating layers forming honeycombs therebetween, subsequently heating areas to be brazed at high temperature in a normal atmosphere with laser beams of a laser producing brazed connections, defocussing the laser beams to cover an area greater than the height of one of the honeycombs, and directing the laser beams at the end surfaces of the metal sheets at an angle for adjusting the depth of the heated areas.

2. Method according to claim 1, which comprises applying the brazing material to the metal sheets prior to the rolling or laminating step, producing the brazed connections at a given number of points of contact between the metal sheets at least as late as the rolling or laminating step, and producing the brazed connections at less than the given number of points of contact at a time.

3. Method according to claim 1, which comprises selectively applying brazing material to at least one outer surface of the metal sheets after the rolling or laminating step and prior to producing the brazed connections with the laser beams.

4. Method according to claim 1, which comprises moving the laser beams during the rolling or laminating step in accordance with increasing structural size of the metal sheets so as to braze layers being added.

5. Method according to claim 1, which comprises moving the laser beams and the metal sheets relative to one another while producing the brazed connections for sweeping the laser beams at least some partly over outer surfaces and end surfaces of the metal sheets.

6. Method according to claim 1, which comprises directing the laser beams at areas where the sheet metal layers first come into contact during the rolling step.

7. Method according to claim 1, which comprises regulating the intensity of the laser beams in dependence on the rolling speed.

8. Method according to claim 2, which comprises pulsing the laser beams in synchronism with the arrival of points of contact between the sheets.

9. Apparatus for producing brazed catalyst carrier bodies from at least partially structured thin metal sheets rolled in alternating layers, comprising means for rolling at least partially structured thin metal sheets together beginning at areas partially structured thin metal sheets together beginning at ares where the sheets first touch one another and forming a roll with increasing structural size and honeycombs between the sheets, means for applying brazing material to the metal sheets, at least one high-energy laser directed at an angle at end surfaces of the metal sheets at the areas where the metal sheets first touch one another during rolling for adjusting the depth of the heated areas, the laser producing a defocussed laser beam covering an area greater than the height of one of the honeycombs in a normal atmosphere at high temperature, and a tracking apparatus for tracking the laser beams in accordance with the increasing structural size of the roll.

* * * * *

UNITED STATES PATENT AND TRADEMARK OFFICE
CERTIFICATE OF CORRECTION

PATENT NO. : 4,824,011
DATED : April 25, 1989
INVENTOR(S) : Wolfgang Maus, Rolf Kottmann, Theodor Cyron & Ludwig Wieres It is certified that error appears in the above-identified patent and that said Letters Patent is hereby corrected as shown below:

Column 6, lines 22, 23 and 24,

". . . partially structured thin metal sheets together beginning at areas partially structured thin metal sheets together beginning at ares . ."

should read:

- - . . . partially structured thin metal sheets together beginning at areas . . . - - .

Signed and Sealed this

Third Day of July, 1990

*Attest:*

HARRY F. MANBECK, JR.

*Attesting Officer*     *Commissioner of Patents and Trademarks*